(12) United States Patent
Schwier et al.

(10) Patent No.: US 6,924,906 B1
(45) Date of Patent: Aug. 2, 2005

(54) PRINTING SYSTEM

(75) Inventors: Hartwig Schwier, Munich (DE);
Ruediger Siemens, Munich (DE)

(73) Assignee: Océ Printing Systems GmbH, Poing (DE)

(*) Notice: Subject to any disclaimer, the term of this patent is extended or adjusted under 35 U.S.C. 154(b) by 0 days.

(21) Appl. No.: 09/913,195

(22) PCT Filed: Feb. 15, 2000

(86) PCT No.: PCT/EP00/01227

§ 371 (c)(1),
(2), (4) Date: Oct. 15, 2001

(87) PCT Pub. No.: WO00/49489

PCT Pub. Date: Aug. 24, 2000

(30) Foreign Application Priority Data

Feb. 15, 1999 (DE) .......................... 199 06 187

(51) Int. Cl.[7] .............................. G06F 15/00
(52) U.S. Cl. .................. 358/1.6; 358/1.4; 358/1.5; 358/296
(58) Field of Search .................. 358/1.6, 1.4, 296, 358/501, 401, 1.5, 1.9, 462; 382/251

(56) References Cited

U.S. PATENT DOCUMENTS

| | | | |
|---|---|---|---|
| 5,574,831 A | 11/1996 | Grenda | ........................ 358/1.4 |
| 5,596,416 A | 1/1997 | Barry et al. | ................. 358/296 |

FOREIGN PATENT DOCUMENTS

| | | |
|---|---|---|
| DE | 44 22 619 | 1/1995 |
| EP | 0 651 318 A2 | 5/1995 |
| EP | 0 782 068 | 7/1997 |
| EP | 0 790 548 | 8/1997 |
| EP | 0 806 721 | 11/1997 |
| EP | 0 886 206 | 12/1998 |
| WO | WO 99/09459 | 2/1999 |

OTHER PUBLICATIONS

ISBN 3–00–001019–X, Das Druckerbuch, Technik und Technologien der Hochleistungsdrucker von Oce Printing Systems GmbH, pp. 14–2 to 14–12.

Palladium Print System, Palladium Design Document.

*Primary Examiner*—Twyler Lamb
(74) *Attorney, Agent, or Firm*—Schiff Hardin LLP

(57) ABSTRACT

A printer system had different printing devices of various designs connected to one another and to a print server with distributes print data to the printing devices. A print job is divided into data groups by the print server for distribution. Status information is sent from the different printing devices to the print server where it is evaluated. Preprocessing and post processing devices are also provided and are monitored by the print server. Flexible configuring of the printing system is provided.

20 Claims, 1 Drawing Sheet

PRINTING SYSTEM

BACKGROUND OF THE INVENTION

1. Field of the Invention

The present invention is directed to a printing system having a number of printer devices, which are each fashioned as an independent component and which respectively have different properties.

2. Description of the Related Art

In printing centers, which are preferably provided with electrophotographic high-performance printers; whose print performance is 40 pages per minute or more, it has only been possible, for a long time, to produce printouts of one single color (monochrome). Printouts in a number of colors are now produced more and more frequently. Electrophotographic high-performance printers are currently, without further ado, capable of printing in two colors, i.e., in a what is referred to as spot color operation or highlight color operation. For example, such a printer is known from the Oce Printing Systems GmbH under the name PAGESTREAM® 200DSC.

In printing centers, a number of devices, e.g. devices for preprocessing and postprocessing are coupled with a printer device to form a printing system. It is frequently the case for print orders, when brochures or books are prepared in low or medium numbers of print editions of between one and a few thousand copies, that a number of black-and-white successive pages must be printed and that only a few color sheets are to be printed. The color design can vary from two colors up to full color images.

In order to be able to carry out such print orders in a performance-adapted fashion, i.e., adapted to the respective properties and printing speeds of the involved printer devices, Published International Application WO-A1-99/09459 (PCT/EP98/05111) suggested to couple printer devices with different color properties to a printing system and to collect the sheet sequences, which are prepared by the different printing systems, in a common sheet collecting device in a fixed sequence.

U.S. Pat. No. 5,574,831 discloses another printing system wherein a number of printer devices, whose printing speeds are relatively slow, are combined in a printing system, which has a higher printing speed than the individual printers. The individual printer devices of this printing system are essentially homogeneously structured among one another. The printing system supplies print data of the print order to the individual printer devices essentially at the same time. This increases the printing speed. U.S. Pat. No. 5,596,416 discloses a similar printing system, wherein a number of printing units are accommodated in a common housing. Incoming print data are internally allocated to the respective printing units and the pages produced by the different printing units are brought together in a common output unit.

European Patent 651 318 A2 discloses a printing system with a printer device, whose control is capable of being connected to a control of a postprocessing device, for example of a printer device, which prints; in a different color into the documents that have already been printed by the first printer device. Not only the data to be printed but also control data is always processed via the control of the first printer device which is referred to as intelligent printer device. This results in a relatively high data throughput in the first printer device.

European Patent 790 548 A1 discloses another printing system, wherein print data is distributed to a number of devices. In this printing system, the print data is also led via the control of a printer device. A disadvantage of this solution is also that the control of the printer device must be so intelligent that it can interpret control data or, respectively, print data for following print devices.

The Palladium™ Design Document, which has been suggested with respect to the Palladium Printing system in cooperation between the MIT/Project Athena upon participation of the companies Digital Equipment Corp., International Business Machines and Hewlett Packard as a reference implementation for the OSI Document Processing Architecture with regard to the standards ISO/IEC 10175, discloses an open printing system for tabletop printers.

The print production control system Oce Domain® is described in the printer's book of the Oce Printing Systems GmbH, ISBN 3-00-001019-X, edition 3c, May 1998, on pages 14–2 to 14–12. In this system, one or more printers are connected to preprocessing devices and postprocessing devices. The system controls and monitors the print production.

German Patent A1-44 22 619 describes a printing system, wherein an administration server can distribute print data to different printers. European Patent A1-806 721 discloses a printing system, wherein different printed pages of a print data stream can be output on different printers (A3, A4, colored paper, etc.).

European Patent A-0782068 and European Patent A-0826206 disclose printing systems, wherein at least one printer device is connected to a network.

SUMMARY OF THE INVENTION

An object of the present invention is to enable an open printing system with which independent printer devices of different structures can cooperate in a flexible manner.

According to a first aspect of the invention, at least two separate printer devices of different structures are connected to a print server, which receives print data from a print data source, such as a host computer or a computer network having different clients attached, and which initially subdivides the print data of a print order (jobs) into data groups. Job-specific bits of information, such as the size of the order, the volume of the edition, the required print resolution, the reproduction of color information, etc., are evaluated for the data subdividing. Subsequently, the data of a data group are group-specifically transmitted to a printer device, which is allocated to the respective group, i.e., are transmitted to a suitable printer device. A corresponding print queue therefore is formed for each printer device. For the multi-device process control of the print order, bits of status information of the independent printer devices are acquired and evaluated. This evaluation can particularly occur in the print server. The group-specific allocation or, respectively, dividing of the data with respect to the corresponding printer devices can particularly occur in a performance-adapted fashion, i.e., adapted to the respective speed and/or print property of the printer device. For example, it can occur dependent on parameters of the print order, such as the size of the print order, the required quality, e.g. print image resolution and particularly dependent on the colors to be printed such as black-white, highlight color, spot color or full color.

On one hand, the print server purposefully forwards selected data groups from the print data source (host, LAN) to the respectively suitable printer devices and, on the other hand, it controls the multi-device process for processing the print order. In this overall process, preprocessing devices such as rollers, sheet suppliers or postprocessing devices such as cutting devices, adhesive binders, spiral binders, envelope stuffers, franking devices, etc., can be integrated as a component of the printing system in addition to the printer devices. Corresponding control data can be already be deposited in the print order, for example that an adhesive binding is necessary in a first print order having an edition of 200 copies and a spiral binding with 100 copies in a subsequent second print order. On one hand, the print server drives the appropriate printer devices that are connected to the corresponding binding devices and forwards the print data to these printer devices. On the other hand, the print server controls the corresponding binding devices.

On the basis of the invention, a regulated system is created wherein print data and/or bits of status information are bidirectionally exchanged between the print server and the devices connected to it (printer devices, preprocessing devices and/or postprocessing devices). The print server therefore does not only act as a collecting location for print data (spooler) but also acts as a multi-device system control.

In a second aspect of the invention, which can be regarded as dependent on the first aspect of the invention, a device-independent platform is created. The print data and/or the bits of status information of all connected devices are processed in an universal data format, which can be read by all devices, by their potentially allocated auxiliary computers and by the print server. In addition to print devices of different structure, the preprocessing devices and postprocessing devices of the printing system can be advantageously included in this data format.

In a third aspect of the invention, which can also be regarded as dependent on the two other aspects of the invention, bits of status information of a number of devices, which are connected to a print server, are acquired in the print server and are evaluated by it. The print server carries out a page-precise and multi-device print production control with error tracking (error recovery). The print product, in particular, can be included in the error tracking in that each printed page is acquired in the printer devices and/or in the postprocessing devices and is checked with respect to a correct run. In particular, measuring means can be used for this purpose with which the printing in the printer devices and/or their further processing can be page-precisely monitored.

In an advantageous embodiment of the third aspect of the invention, the multi-device process control, the bits of status information of the connected devices, are acquired by the print server in a page-by-page fashion and are balanced with one another. It is thus possible to promptly stop the entire printing process in case of a malfunction in one of the connected devices. After the malfunction has been eliminated in the one device, the printing process then can be newly set up or, respectively, continued in a page-precise manner in all other devices. Large quantities of waste paper can be prevented as a result.

On the basis of the central connection of the different, connected devices in the central print server, a loosely coupled, flexible printing system composed of different devices that are fashioned as individual constructional units can be created via an uniform interface (abstraction layer).

The central print server also makes it possible to act as a central control console over corresponding control programs for driving the connected devices. It is thus possible to configure the different connected devices, particularly printer devices, from a central location.

BRIEF DESCRIPTION OF THE DRAWINGS

Exemplary embodiments of the invention are subsequently explained in greater detail on the basis of the Figures.

DETAILED DESCRIPTION OF THE PREFERRED EMBODIMENTS

Figure 1:
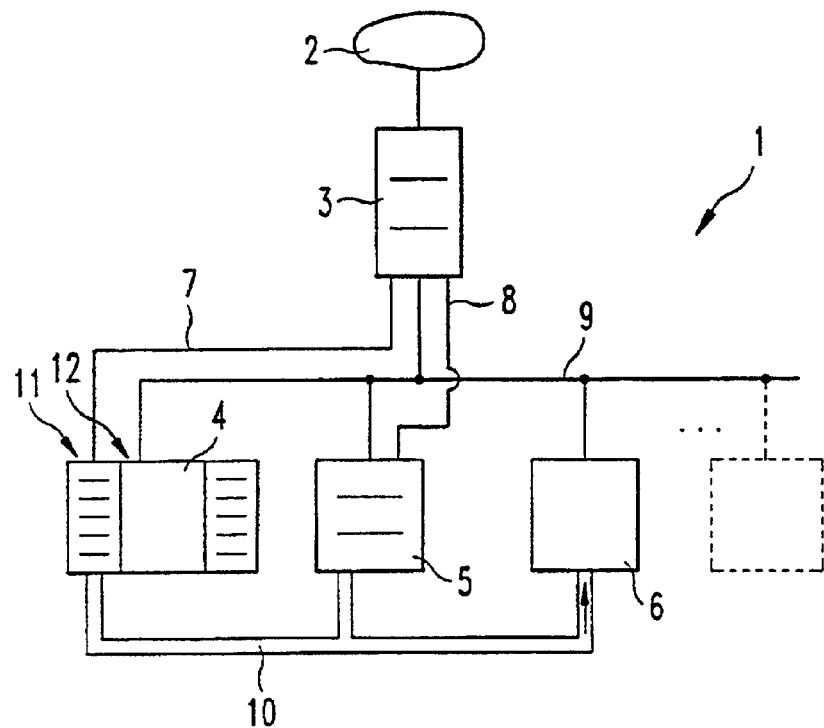
FIG. 1 is a functional block diagram which shows a printing system composed of a number of printer devices and preprocessing devices and postprocessing devices.

FIG. 1 shows a printing system 1, wherein a central print server 3 cooperates with different printer devices 4 and 5. Such a system predominately corresponds to the printing system described in the International Patent Application PCT/EP98/05111. The content of this PCT application is herewith incorporated by reference into the present specification.

The print server 3 receives print data from a print data source 2, for example from a host computer or a computer network, for example from a local area network (LAN) or via the (Internet (for example, on the World Wide Web). The print server 3 is capable of understanding and interpreting different print data streams such as IPDS (Intelligent Print Data Stream), PCL and LCDS. The print server checks these data with respect to on which of the connected printer devices 4 and 5 the respective data of a print order (job) performance, i.e. upon optimal utilization of the properties of the connected printer devices 4 and 5 can ensue. On one hand, the print server has the critical performance data of the connected printer devices of the system deposited in a memory for this purpose. On the other hand, the print server has a permanent or regular connection with the printers that are connected to the printing system, whereby it can monitor their status via said printers the connection, for example the number and length of the print data (queues) waiting at the printer for printing and the ready status (on/off) of the printer.

Although FIG. 1 shows only two printer devices 4 and 5, the number of the connected printer devices of the system basically can be arbitrarily large. It is also not necessary that the printer devices 4 and 5 and the print server 3 are set up at the same location, but they can be set up at different locations worldwide. For example, if the printer device 4 is a device which prints in a monochrome fashion—e.g. in black, and if the printer 5 is a full color printer device, the print server 3 sends all printed pages on which only monochrome bits of information are to be output to the printer device 4. On the other hand, printed pages that are to be printed in a multicolored fashion are sent to the printer device 5. The print data is transmitted from the print server 3 to the printer device 4 via the data line 7 and is transmitted from the print server 3 to the printer device 5 via the data line 8. A logical data transmission plane is thus defined.

In a second data plane, namely the control level, the print server 3 is connected to the printer devices 4, 5 and to a postprocessing device 6 for the print product at the part of the control. The bits of status information are respectively exchanged between the connected devices and the print server 3. The print server 3 therefore acts as a production control device for all pages that belong together with respect to a printing job. Pages that are printed in the printer devices 4 or, respectively, 5 are collected and further processed in the postprocessing device 6 such as a collecting device. On the basis of this arrangement, it is possible, for example, to highly precisely control the printing of a book. All data arrive at the print server 3, which distributes them on the print data plane to the two stand-alone printer devices 4 and 5. The printer 3 can control the production process via the bits of status information of the printer devices 4 and 5 and of the postprocessing device 6, i.e. it can monitor whether all pages of a respectively printed book are properly printed in the printer devices 4 and 5 and are properly gathered in the postprocessing device 6. An optical bar-code read device, which page-precisely detects the document stream 10 proceeding from the printer devices 4 and 5, serves this purpose. An individual page information (bar-code) is assigned to each page to be printed by the print server 3, whereby sa the page information is printed at suitable locations of the respective printed pages in the printer devices 4 and 5 and is acquired by the bar-code read devices. These, in turn, transmit the read bits of information to the print server, which regulates the production process.

The printer devices are stand-alone devices which can be connected directly to a host computer or to a LAN/WAN. For this purpose, they have a separate, independent device control and possibly a raster processor with which a print data stream is rastered pixel by pixel for driving the respective print unit.

In the case of error, the page-precise acquisition of the documents makes it possible to newly set up a reprint process in a page-precise manner, so that only a small quantity of waste paper is produced. This is particularly relevant when larger documents such as books are printed in such a production system.

In the exemplary embodiment shown in FIG. 1, it is assumed that the print server 3 and the connected devices 4, 5 and 6 have a defined communication language or, respectively, have a common protocol on the data control level or, respectively, device control level. This is frequently not the case with respect to standalone devices such as the printers 4 and 5.

Figure 2:
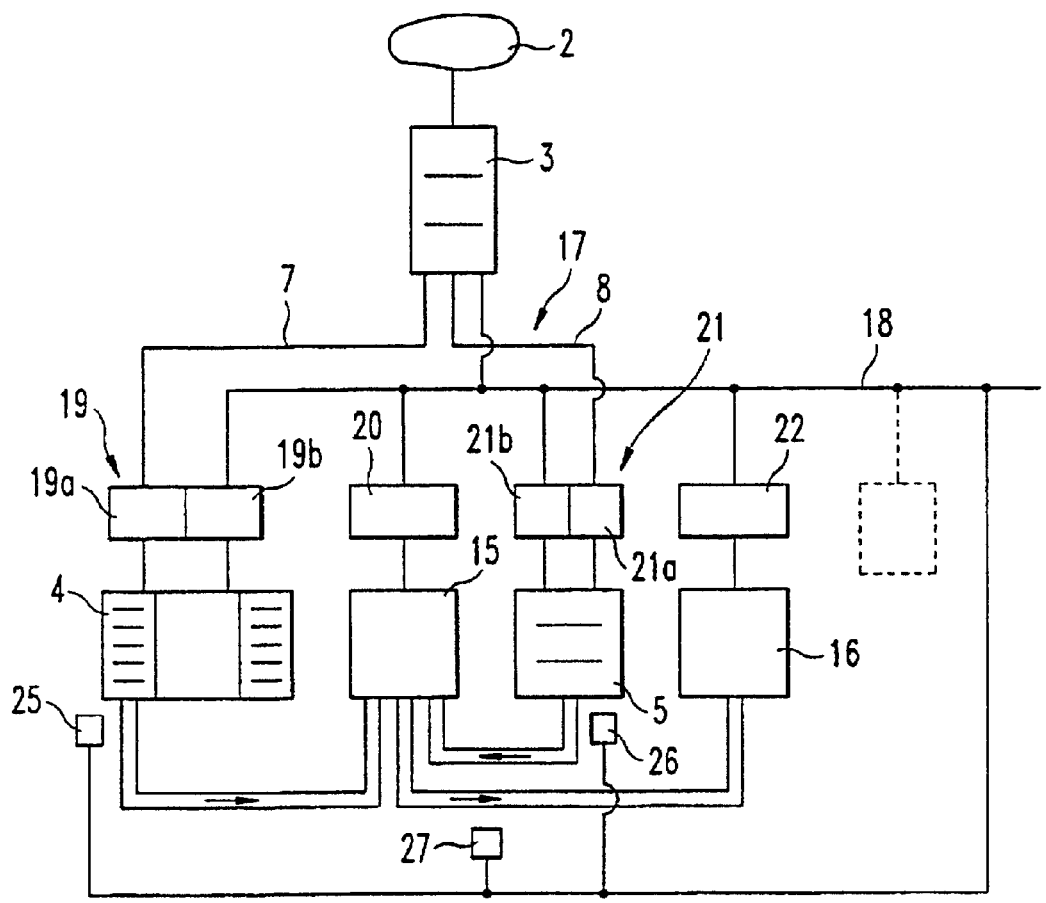
FIG. 2 is a functional block diagram which shows a printing system with auxiliary computers that are allocated to the connected printer devices.

In FIG. 2, auxiliary computers 19, 20, 21 and 22 therefore are switched between the respective devices 4, 5, 15 and 16 and the print server 3, whereby the auxiliary computers translate the device-individual properties (control commands, print languages to be processed) into an abstract or, respectively, standardized plane in the control lines 17 and 18.

The line 17 is used as a data control line (bus). On the print data plane 17, the print server 3 allocates the data to be printed to the two printer devices 4 and 5 in a group-by-group or particularly in a page-by-paged manner. The data allocated to the printer device 4 is received in the auxiliary computer 19, which is allocated to it via a data interface 19a. The auxiliary computer 19 edits these data with respect to a data format that is suitable for the printer device 4. The data can be processed particularly by a raster image processor (RIP) before it is supplied to the printer device 4. The control bus 18 receives the control data via the control interface 19b of the auxiliary computer. Analogously, the data is fed from the auxiliary computer 21 of the printer device 5 via the line 8 into its data interface 21a. The control data is received by the auxiliary computer 21 via the control interface 21b and is correspondingly converted into a format; which can be read by the second printer device 5. All connected devices, particularly devices of different producers, can communicate with the print server 3 on the control line 18 or, respectively, on the what is referred to as abstraction level (abstraction layer) via the auxiliary computers (converters) allocated to them. The merge device (merger 15) is accordingly connected to the control bus 18 via a control computer 20. The pages, which are printed independently of one another in the two printer devices 4 and 5, are merged corresponding to the job sequence and are supplied to a further postprocessing device such as the envelope stuffer 16. This envelope stuffer 16 also has a control computer 22 with which it can exchange bits of status information with the print server 3. In this case, the print server 3 can also monitor and control the production process between all connected devices.

On the basis of the indicated system structure, it is particularly possible to centrally configure all of the connected devices, such as the printer device, preprocessing device or postprocessing device, from the print server 3. The print server therefore acts as a central control console for adjusting the connected devices and for monitoring and controlling the printing production process in the entire system.

For monitoring print orders (jobs), it is provided in the print sever 3 to have a job initial page and a job end page printed. Bar-code readers 25, 26 and 27 at the respective devices 4, 5 and 16 monitor the admission or, respectively, discharge of the pages at the devices 4, 5, 16 and communicate the positions of the corresponding pages via the data bus 18. Furthermore, the print server 3 provides each page to be printed with a bar-code and is balanced with the bar-code reader 25, which monitors the proceeding side stream of the printer 4, and with the bar-code reader 26, which monitors the proceeding side stream of the printer 5, and with the bar-code reader 27, which monitors the proceeding side stream of the merger 15. In the case of error, the print server 3 therefore can page-precisely determine the location of the error and corresponding correcting measures can be initiated. For example, if an error occurs when page 23 is printed in the printer device 5, the print server 3 can purposefully drive the reprinting or, respectively, the new setup in this printer device, while all other pages, which have been printed before or later in the second printer device 4, are page-precisely introduced into the merger 15. Therefore, only a small quantity of waste paper arises in the case of an incorrectly printed page. Instead of optical bar-code readers, it is certainly possible to use other read devices such as character recognition devices (OCR) or magnetic bar-code readers (MICR).

The systems shown in FIGS. 1 and 2 particularly represent a multi-device production system for documents. Forms from other locations can be fed into the print server 3 via data long-distance lines, e.g. via the Internet, whereby the forms can be started at the location given corresponding calls of print jobs.

On the basis of a uniform control level (an abstraction layer), it is possible to flexibly operate n different printers, which respectively have n different controls or, respectively, n different data controllers and m different technologies (e.g. color printing, black-white printing, different resolutions, electrophotographic devices, inkjet printer devices, etc.) together in a printing system (n, m>1). It is relatively simple to exchange individual devices in such a printing system or, respectively, to transfer them from one system into another system. It can occur on a pure data control level in that the printer devices of a first printing system, on the part of the control, are allocated to a second printing system at a specific point in time. A modular system, as it were, therefore arises, so that the operator of one or more printing centers also has flexible design possibilities for processing different print orders (print jobs) in a multi-device fashion. The processing of print orders and even the configuration of different print systems therefore can be in the chronologically planned and the load of printing centers therefore can be optimized worldwide in a performance-adapted fashion.

Contrary to FIG. 2, the rastering can ensue in computers that are allocated to the respective printer devices. On the other hand, such raster processes can ensue in the individual printer devices and/or in the central print server 3.

Although other modifications and changes may be suggested by those skilled in the art, it is the intention of the inventor to embody within the patent warranted hereon all changes and modifications as reasonably and properly come within the scope of their contribution to the art.

What is claimed is:

1. A printing system, comprising:
    at least one print data source having print data;
    at least one print server which receives print data from said at least one print data source;
    a plurality of different standalone printer devices of different structure, said standalone printer devices being connected to said at least one print server to receive print data from said at least one print server;
    said at least one print server subdividing the print data of a print order into data groups;
    the print data of a data group being group-specifically transmitted to a standalone printer device that is allocated to the group;
    bits of status information of the standalone printer devices being evaluated for the multi-device process control of the print order; and
    the bits of status information being evaluated in the print server.

2. A printing system as claimed in claim 1, further comprising:
    a print data line and to a control line connected to the print server.

3. A printing system as claimed in claim 1, further comprising:
    an auxiliary computer allocated to said at least one stand alone printer device which receives the print data from the print sever and converts them into a print data format that is adapted to the printer device.

4. A printing system as claimed in claim 3 wherein said auxiliary computer is a standalone computer.

5. A printing system as claimed in claim 3, wherein the generated print product is acquired page by page so that a production process of a print order is page-precisely monitored.

6. A printing system as claimed in claim 1, wherein the print data of all data groups are processed in the print server in an universal data format which can be read by all connected auxiliary computers.

7. A printing system as claimed in claim 1, further comprising:
    a control interface in the print server with which at least one of the standalone printer devices and their auxiliary computers connected to the print server can be centrally configured.

8. A printing system as claimed in claim 1, wherein bits of information with two colors at a maximum can be output in a first standalone printer device and bits of information in full colors can be output in a second standalone printer device.

9. A printing system as claimed in claim 1, wherein the print data is rastered in the print server and is transmitted as rastered images to the standalone printer devices or to their allocated auxiliary computers.

10. A printing system as claimed in claim 1, wherein at least one of the standalone printer devices and the print server are respectively set up at different locations, and further comprising:
    a data long-distance network connecting the standalone printer devices and the print server to one.

11. A printing system as claimed in claim 1, wherein forms are deposited at the print server which are connected to a print document by variable data that is fed via a data input of the print server.

12. A system according to claim 11, further comprising:
    a user computer is connected to the data server via a data long-distance network to deposit the form data in the print server.

13. A printing system as claimed in claim 1, further comprising:
    at least one additional device which further processes the print product from the standalone printer devices and is connected on a control level to at least one of the print server and the standalone printer devices.

14. A printing system as claimed in claim 1, further comprising:
    at least one additional device which further processes a print product that is supplied to the standalone printer devices and is connected on a control level to at least one of the print server and to the standalone printer devices.

15. A printing system as claimed in claim 13, wherein the print server monitors all devices involved in the production process of a print order by evaluating bits of status information until a product order is completed and drives the devices.

16. A printing system as claimed in claim 15, wherein the bits of status information are output by the additional print devices including at least one of preprocessing devices and postprocessing device that are connected to the print server.

17. A printing system as claimed in claim 16, wherein said additional print devices are connected to said print server by monitoring devices allocated to the additional print devices.

18. A printing system as claimed in claim 1, wherein the print server has a data bank in which at least one of production-relevant and device-specific data of the connected devices are stored.

19. A printing system as claimed in claim 1, wherein said print server has an expert system with which at least one of production-relevant and device-specific bits of status information are processed in a self-learning fashion such that the expert system optimizes itself concerning an efficient print production process with a progressing print service life.

20. A printing system as claimed in claim 1, wherein the print server communicates with its connected devices in a device-independent control language.

* * * * *